Dec. 12, 1972 C. J. MAY, JR 3,706,091

DIGITAL THRESHOLD DETECTOR

Filed Sept. 4, 1970 2 Sheets-Sheet 1

INVENTOR
C. J. MAY JR.
BY Norman D. McClaskey
ATTORNEY

3,706,091
DIGITAL THRESHOLD DETECTOR

Carl Jerome May, Jr., Holmdel, N.J., assignor to Bell Telephone Laboratories, Incorporated, Murray Hill, N.J.

Filed Sept. 4, 1970, Ser. No. 69,752
Int. Cl. H04l 3/00
U.S. Cl. 340—347 DD 12 Claims

ABSTRACT OF THE DISCLOSURE

A method of, and circuitry for, converting PCM code groups generated by sampling the analogue signal level on a line into a set of signals representing discrete analogue amplitude levels present in the sampled signal is disclosed. Each newly generated code group is applied to a comparator which compares its absolute value with a stored code. The stored code is simultaneously applied to a code translator which converts it into a set of discrete amplitude signals. When the comparison indicates that a selected relation has existed between the code groups generated by samples of the line and the stored code for a selected interval, the current code group replaces the stored code to indicate the changes in signal magnitude on the sampled line.

BACKGROUND OF THE INVENTION

(1) Field of the invention

This invention relates to code conversion and, more particularly, to a method of, and circuitry for, converting digital code groups representing analogue signal levels on a line into a set of discrete signals that correspond to selected amplitude levels present in the analogue signal level.

(2) Description of the prior art

The prior art shows numerous circuits for converting from one type of digital code to another, such as binary to binary-coded-decimal, or for converting digital codes to analogue signals. While this circuitry is useful in many fields, it is of no use where there is a necessity to determine selected amplitude levels present in an analogue signal being transmitted by a PCM transmission system without first converting the transmitted PCM codes back into the analogue signal. In essence, the prior art includes conversion circuitry, but this circuitry does not provide the type of conversion obtained by using applicant's invention.

SUMMARY OF THE INVENTION

Applicant's invention detects selected analogue thresholds, or signal levels, directly from the digital code groups being used to transmit sampled amplitudes present in an analogue signal. The invention converts digital code groups generated by repetitive sampling of the analogue signal level on a line into a set of discrete amplitude level signals by using the code groups to continuously approximate the peak signal level on the line. A digital code, representing the approximation, is applied to a code translator that generates a set of discrete signals, referred to as amplitude level signals, which correspond to selected amplitude levels present in the approximated amplitude. More specifically, a circuit for practicing the method continuously approximates the peak value of the analogue signal on a line by comparing the absolute value of the current code resulting from a sample of the line with a stored code obtained on a previous sample of the line. The stored code is contained in a storage location associated with the line. When a selected relationship exists between the current code and the stored code for a selected period, the former replaces the latter in the storage location associated with the line. The stored code, representing the current approximate peak value of the signal on the line being sampled, is applied to a code detector which generates the desired amplitude level signals.

It is an object of this invention to convert pulse code groups representing the sampled amplitudes of an analogue signal into a set of discrete analogue amplitude level signals.

It is another object of this invention to eliminate the need for conversion of pulse coded analogue signals back into their original form in certain types of circuitry operated in conjunction with pulse code systems.

It is a more specific object of this invention to eliminate the need for conversion of pulse coded analogue signals back into their original form in a common control digital echo suppressor used in conjunction with a PCM transmission system.

In eliminating the need for converting pulse coded analogue signals back into their original form in certain types of circuitry, the invention reduces the cost of such circuitry. A specific example of one type of circuitry using the invention is the time-shared common control digital echo suppressor disclosed in the application of R. E. La Marche and C. J. May, Jr., Ser. No. 68,921, filed Sept. 2, 1970, now U.S. Pat. 3,673,355, issued June 27, 1972. As used in this echo suppressor, the invention eliminates the need for expensive per trunk threshold detection circuitry to generate the amplitude level signals required to operate the echo suppressor. Furthermore, the invention makes it economically feasible for the echo suppressor to be used with a multiplexed PCM transmission system. In essence, the key advantage of the invention is that it provides a more economical means for performing the indicated conversion than is available in the prior art.

DESCRIPTION OF THE INVENTION

Figure 1:
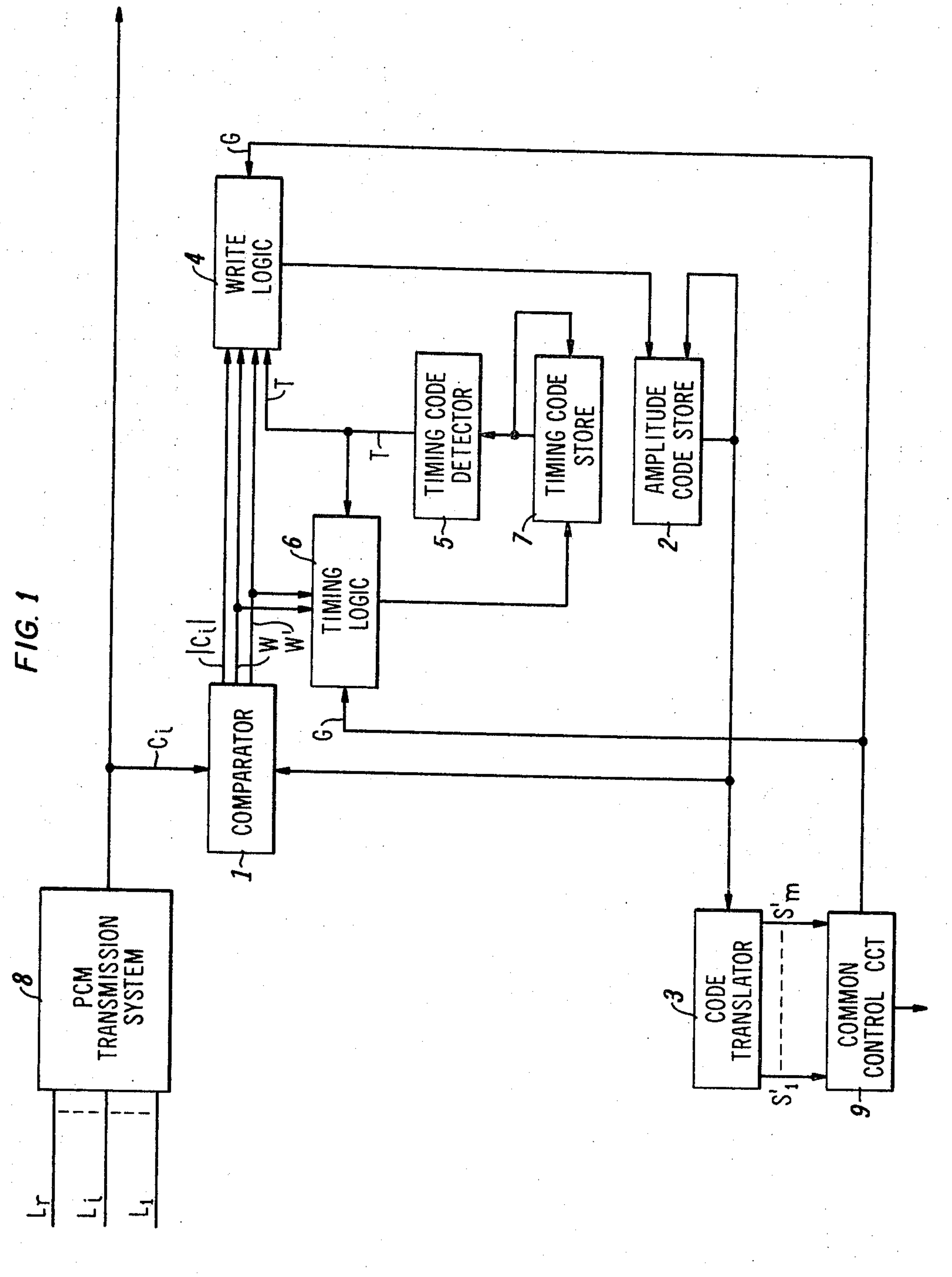
FIG. 1 shows a schematic block diagram of the circuit.

The circuit shown in FIG. 1 is most economical when used in conjunction with a multiplexed PCM system 8. When used in this context, the input codes generated by the sampling of a given line $L_i$ are always applied to the comparator 1 in a given transmission system time slot assigned to the line. The operation of the circuit is synchronized with the occurrence of the multiplexed system's time slots. In other words, every time the code $C_i$ is generated in the time slot $i$ for line $L_i$, the stored code $S_i$, also associated with the line $L_i$, is available at the output of the amplitude code store 2. Additionally, the contents of the storage location containing $S_i$ may be altered by the write logic 4 during the $i^{th}$ time slot.

Figure 2:
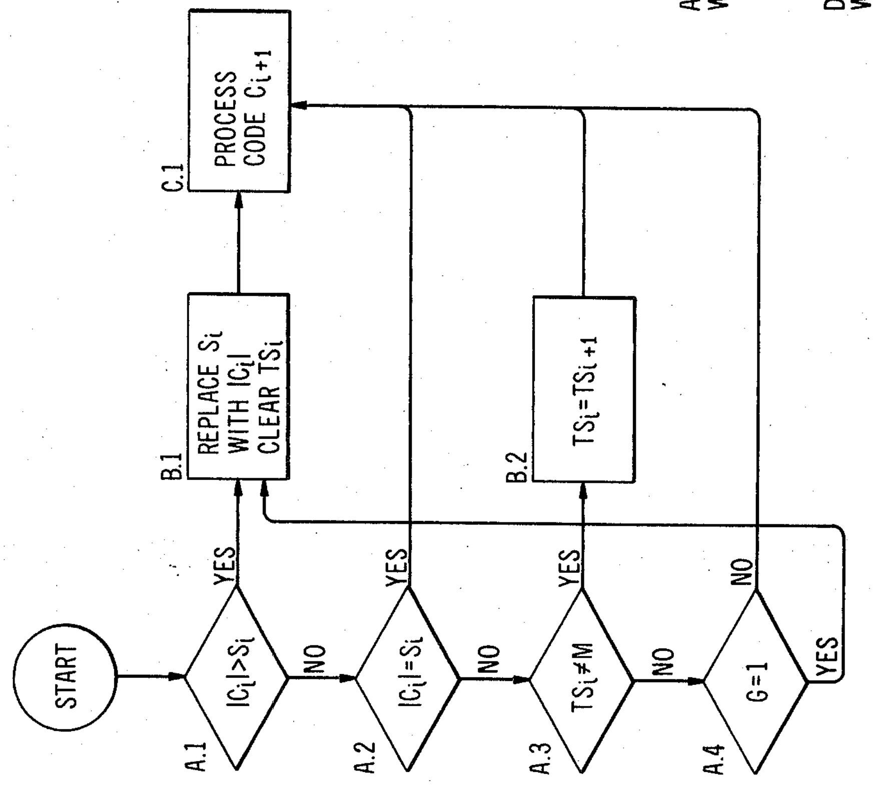
FIG. 2 shows a flow chart useful in describing the method of operation of the circuit.

The general operation of the circuit is readily understood when described in conjunction with the flow chart shown in FIG. 2 which illustrates the method of conversion. The flow chart form was used in FIG. 2 to emphasize that the method could be carried out on a stored program computer just as readily as it can be performed on wired circuitry. When the $i^{ht}$ time slot occurs, the code $C_i$ is generated by a sample of the line $L_i$ and (FIG.

1) applied to the circuit. During this time slot, the stored code $S_1$, associated with the line $L_1$, is compared with the absolute value of the code $C_1$ in step A.1 (FIG. 2). If $|C_1|$ is greater than $S_1$, which is also an absolute value, $|C_1|$ replaces the code $S_1$ in step B.1. Simultaneously, a storage location containing a timing code $TS_1$, also associated with the line $L_1$, is cleared in step B.1. After completing these steps, the circuit then processes the code $C_{1+1}$ generated in the $i+1$ time slot when $L_{1+1}$ is sampled.

This series of steps is performed when the current signal level on line $L_1$ has a magnitude greater than it had on past samples. Replacing the stored code $S_1$ with the code $|C_1|$, which represents an increase in the magnitude of the signal level on line $L_1$, records the increase. The newly stored code $S_{12}=|C_1|$ will remain unaltered until the signal level magnitude on line $L_1$ increases still further, or until the magnitude of the signal level on line $L_1$ decreases, and remains at this lower magnitude for a selected period of time. If the signal level magnitude increases, $S_{12}$ will be replaced by the absolute value of the newly generated code as described above.

On the other hand, if the signal level magnitude on line $L_1$ drops, the absolute value of the code $|C_1|$ produced when the line $L_1$ is sampled will be less than the stored code $S_{12}$. Consequently, performance of step A.1 (FIG. 2) will result in step A.2 being performed next instead of step B.1, as was the case above. Since it has been assumed that the current $|C_1|<C_{12}$, the step A.3 will be performed after step A.2. The step A.3 involves determining if the current $|C_1|$ has been less than $S_{12}$ for a selected period M. In this case, the condition $|C_1|<S_{12}$ has just been recognized during the current line $L_1$ time slot. Consequently, the stored timing code $TS_1$ associated with line $L_1$ will be given. This value of $TS_1$ is less than M which usually represents a period of time required for the occurrence of some multiple of time slots for the line.

Since $TS_1 \neq M$, the next step B.2 (FIG. 2) performed is the step of incrementing the stored timing code $TS_1$ by one. Following the incrementing operation, the code $C_{1+1}$ occurring in the $(i+1)^{th}$ time slot is processed. As long as the signal level magnitude on line $L_1$ remains low enough that the absolute value of the resulting code $C_1$, generated when the line $L_1$ is sampled, is less than $S_{12}$, the step A.1, A.2, A.3, B.2, and C.1 discussed above will be repeated. Each time this set of steps is performed, the stored timing code will be increased by one. After code $TS_1$ has been incremented a selected number of times, the conditions $TS_1=M$ will exist when the time slot for line $L_1$ occurs. When this condition exists, step A.4 is the step performed after step A.3, instead of the B.2 step.

In step A.4, it is determined if the common control circuitry 9 (FIG. 1) requires the amplitude level signals $S'_1$–$S'_m$ representing discrete amplitude levels in the approximated signal amplitude on line $L_1$. The common control circuitry 9 (FIG. 1) requires amplitude level signals $S'_1$–$S'_m$ for line $L_1$ at a rate that is a submultiple of the rate at which codes generated by the line are applied to the threshold detector. If the amplitude level signals $S'_1$–$S'_m$ are not required, the stored code $S_{12}$ is left unaltered and the threshold detector will process the code $C_{1+1}$ generated by a sampling of line $L_{1+1}$ during the next time slot. On the other hand, if the common control circuit 9 (FIG. 1) does require the amplitude level signals representing the signal level on line $L_1$, the condition G=1 will exist, and step B.1 is performed. The signal G is an interrogate signal generated by the common control circuit 9 (FIG. 1) when it requires the amplitude level signals $S'_1$–$S'_m$ for a line.

At this point, when G=1, the stored code $S_{12}$ is applied to the code detector 3 (FIG. 1) and generates the required level signals $S'_1$–$S'_m$. This signal generation occurs during the common control time slot associated with the $L_1$ line. After this generation of amplitude level signals, the stored code $S_{12}$ is replaced with the absolute value of the newly generated code $|C_1|=S_{13}$ which represents the decreased value of the signal level magnitude on line $L_1$ in step B.1 (FIG. 2). Additionally, the timing code $TS_1=M$ is also cleared at this time. The next time the common control circuitry requires amplitude level signals associated with the line $L_1$, the stored code $S_{13}$ will be used to generate those signals if the signal level magnitude on line $L_1$ has not changed.

Replacing $S_{12}$ with $S_{13}$ in the manner described above results in the generation of sets of amplitude level signals that represent the change in the peak signal level on line $L_1$ more accurately than could be obtained by replacing $S_{12}$ with $S_{13}$ merely on the basis of the expiration of the time interval M. Since $S_{13}$ is equal to the absolute value of the code generated on the last of a number samples of the line $L_1$ that were less than $S_{12}$, there is no way of knowing whether the level of the line was going down or moving toward the level represented by $S_{12}$ when the replacement occurred. If the level on the line $L_1$ was rising when $S_{13}$ replaced $S_{12}$, it is possible that on the next sample of the line, a code $C_1$ would be generated with an absolute value that exceeded $S_{13}$. If this occurred, $S_{13}$ would be replaced on the next sample. By waiting to replace $S_{12}$ until after the common control circuitry has utilized the amplitude level signals it generates, the threshold circuit has a number of samples of the line $L_1$ to stabilize the stored code, after $S_{13}$ replaces $S_{12}$, before the common control will require amplitude level signals again. This type of operation generates amplitude level signals that more accurately reflect the signal conditions on the line $L_1$.

A more detailed description of the digital threshold detector circuit is presented in the following discussion. When the transmission system 8 (FIG. 1) samples line $L_1$, the code $C_1$ is generated and applied to the comparator 1 during the $i^{th}$ transmission system time slot. Simultaneously, the stored code $S_1$, associated with line $L_1$, is available at the output of the amplitude code store 2 and this code is also applied to the comparator 1 as a second input. Additionally, the code $S_1$ is applied to the code detector 3 which translates it into amplitude level signals $S'_1$–$S'_m$. The amplitude code store 2 operates in synchronism with the transmission system and may be comprised of recirculating acoustical delay lines. The comparator 1 compares the two codes, ignoring the sign of the code $C_1$, to determine the relationship between them.

If $|C_1|>S_1$, representing an increase in signal level magnitude on line $L_1$, the comparator 1 generates a write signal W that is applied to the write logic 4 along with $|C_1|$. The application of the signal W to the write logic 4 results in $|C_1|=S_{12}$ replacing $S_1$ in the memory location of the amplitude code store 2 allocated for line $L_1$. In effect, this operation associates the new higher valued stored code $S_{12}$ with line $L_1$ to indicate the signal level magnitude increase on the line. Furthermore, the signal W is also applied to the timing logic 6 and results in the location of the timing code store 7 associated with line $L_1$ being cleared. Upon completion of these operations, the detector is ready to process the code $C_{1+1}$ which is generated when line $L_{1+1}$ is sampled during the next transmission system time slot. The timing code store 7, like the amplitude code store 2, may be a recirculating store that operates in synchronism with the transmission system 8. The foregoing operations correspond to the operations represented in steps A.1, B.1, and C.1 of the flow chart in FIG. 2 which are performed when the absolute value of code $C_1$ represents a signal level magnitude that is greater than the magnitude represented by the stored code $S_1$.

As indicated in the discussion of FIG. 2, the newly stored code $S_{12}$ will remain in the amplitude code store 2 (FIG. 1) until the magnitude of the signal level on line $L_1$ increases above, or decreases below the level represented by that code. If the signal level magnitude increases, $S_{12}$ will be replaced in the same manner described above. On the other hand, if the signal level magnitude decreases, the stored code $S_{12}$ will be replaced only after this decreased magnitude has existed a selected interval M.

Assuming that on the next sample of line $L_1$ the signal level magnitude on the line has decreased to a level such that the absolute value of the code $C_1$ generated when line is sampled is less than the stored code $S_{12}$ associated with the line, the digital threshold detector operates as follows. During the $i^{th}$ transmission system time slot, the code $C_1$ and the stored code $S_{12}$ are applied to the comparator 1 (FIG. 1). Simultaneously, the stored code $C_{12}$ is also applied to the code detector 3 which generates the amplitude level signals $S'_1$–$C'_m$. Since $|C_1| < S_{12}$ the comparator 1 will generate the signal W'. Application of this signal W' to the timing logic 6 results in the contents of the memory location in the timing code store 7 allocated for storing the timing code $TS_1$ for line $L_1$ being incremented by one. There will be no output from the timing code detector 5 since the stored timing code $TS_1$ is not equa to the value M. It will be recalled that the value M indicates that the level on line $L_1$ has been less than the level represented by the stored code $S_{12}$ long enough to warrant replacing $S_{12}$. After the stored timing code $TS_1$ has been incremented, the threshold detector begins processing the code $C_{i+1}$ generated by the sampling of line $L_{i+1}$ in the $(i+1)^{th}$ time slot of the transmission system.

The above operations will be repeated for every sample of line $L_1$, while the magnitude of the amplitude level on it remains less than the magnitude represented by the stored code $S_{12}$, and the stored timing code $TS_1$ will continue to be incremented. Finally, a point will be reached where the application of the absolute value of $C_1$ and the stored code $S_{12}$ will generate the signal W', indicating $|C_1| < S_{12}$, and the stored timing code $TS_1$ will be equal to M. The condition $TS_1=M$ will result in the timing code detector 5 generating the signal T which is applied to the write logic 4 and timing logic 6. At this time, the stored code $S_{12}$ will also be present as an input to the code detector 3 which translates the code into the amplitude level signal $S'_1$–$S'_m$.

The generation of the signals W' and T is not, in itself, sufficient to result in the stored $S_{12}$ being replaced with a new code $|C_1|=S_{13}$ to reflect the decreased signal level magnitude on the $L_1$ line. In the absence of the interrogate signal G, indicating that the common control circuitry 9 requires the amplitude level signals $S'_1$–$S'_m$ for line $L_1$, the stored code $S_{12}$ remains unaltered in the location of the amplitude code store 2 allocated for the line. In this situation, the foregoing steps, with the exception of the incrementing of $TS_1$, are repeated for each sample of the line $L_1$ until the common control circuitry 9 generates the interrogate signal G during the $i^{th}$ time slot. During these samples of line $L_1$, the comparator 1 will continue to generate the signal W' since the magnitude of the signal level on the line remains at a level lower than the magnitude represented by the stored code $S_{12}$. Similarly, the existence of the signal T disables the timing logic during the $i^{th}$ time slot and the stored timing code $TS_1=M$ of line $L_1$ remains unaltered.

When the common control interrogate signal G, indicating that the common control circuitry 9 requires the amplitude level signals $S'_1$–$S'_m$ for line $L_1$, is generated and the signals W' and T exist, the write logic 4 will be enabled. This enabling of the write logic 4 results in the stored code $S_{12}$ being replaced with the new stored code $|C_1|=S_{13}$ to reflect the reduced magnitude of the signal level on line $L_1$. The replacement is accomplished after the stored code $S_{12}$ has been used to generate the amplitude level signals $S'_1$–$S'_m$ required by the common control circuitry. Similarly, the concurrent existence of the signals G, W' and T also result in the timing logic 6 clearing the location in the timing code store 7 which contains $TS_1=M$. This operation initializes the timing code for line $L_1$ which will be altered on future samples of the line.

As was previously mentioned, the replacement of the code $S_{12}$ is postponed until after it is used to generate the amplitude level signals $S'_1$–$S'_m$ required by the common control 9 to obtain a more accurate approximation of the changing signal level on the line $L_1$ for the common control. By postponing the replacement in this manner, the threshold detector has several samples of the line $L_1$, after $S_{13}$ replaces $S_{12}$, in which to stabilize the stored code associated with the line before the stored code must be used again to generate amplitude level signals for the common control. In essence, this mode of operation bridges transitions in signal levels and provides a more nearly correct approximation of the peak signal level on a line.

Figure 3:
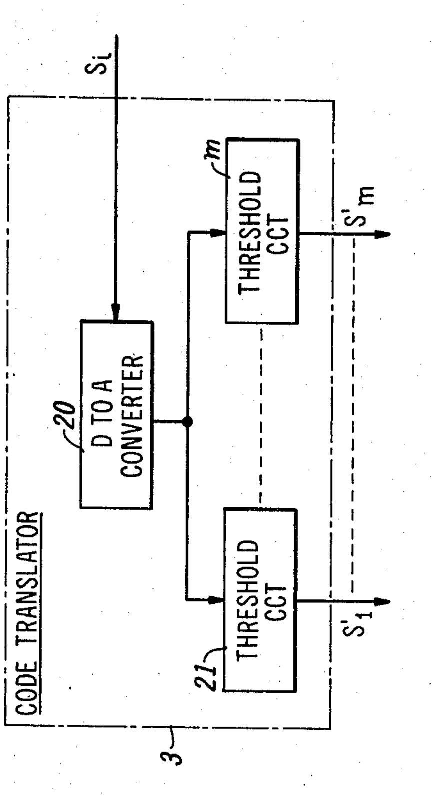
FIG. 3 is an illustrative example of one type of circuit that could be used as the code translator shown in FIG. 1.

A more detailed illustrative example of the code translator 3 (FIG. 1) appears in FIG. 3. Essentially, the translator 3 may be composed of a digital-to-analogue converter 20 whose output is applied to a plurality of analogue threshold circuits 21 through *m*, each of which is biased to a different level. When the stored amplitude code $S_1$ is applied to the digital-to-analogue converter 20 the converter generates an analogue output. This analogue output is applied to all the circuits 21 through *m* and each of the circuits whose bias level is exceeded by the analogue signal is enabled to generate discrete amplitude level signals. For instance, if the stored amplitude code $S_1$ produced an analogue output exceeding the bias on all the circuits 21 through *m*, then all the circuits would be enabled to produce all the amplitude level signals $S'_1$ through $S'_m$. On the other hand, if the stored amplitude code $S_1$ produced an analogue signal that exceeded only the bias on the circuit 21, which generates the lowest level amplitude level signal, then only amplitude level signal $S'_1$ would be generated.

Figure 4:
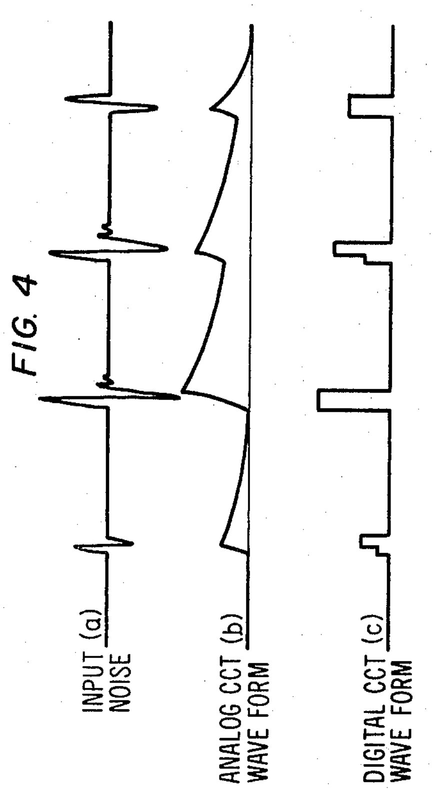
FIG. 4 is useful in the description of the illustrative embodiment.

A digital threshold detector, such as the one described above, also minimizes the effect input noise has on the operation of the common control circuitry 9 (FIG. 1) that is driven by the output of the detector. This is illustrated graphically in FIG. 4. If the approximated input signal envelope that is applied to threshold circuits 21 through *m* (FIG. 3) were generated by the output of a standard analogue circuit, instead of the output of the digital detector, the occurrence of the noise spikes, shown in row *a*, at the input of the analogue circuit would produce the signals shown in row *b* as the approximated signal envelope. The waveform in row *b* indicates that, due to the relatively slow response time of an analogue circuit using R-C networks, the occurrence of input noise spikes on a line $L_1$ (FIG. 1) can have a substantial effect on the approximated signal envelope applied to the threshold detectors 21 through *m* (FIG. 3). In essence, an analogue circuit operating as shown in row *b* (FIG. 4) can give erroneous indications of the presence of speech signals on a line $L_1$ due to the presence of noise on the line. This problem is avoided in applicant's digital detector which is capable of responding to changes in input signal amplitude very rapidly. The response time of the digital detector is controlled by, among other things, the timing and interrogate signals $TS_1$ and G (FIG. 2) discussed above. Consequently, the period during which a noise spike effects the signal envelope being approximated by the digital detector is controlled by the choice of the times represented by the signals $TS_1$ and G. As indicated by the waveform in row *c* (FIG. 4), the envelope of the noise signals at the input of the digital detector is accurately approximated, for application to the threshold detectors 21 through *m*, if the times represented by $TS_1$ and G are properly chosen.

The foregoing has described applicant's novel method of, and circuitry for, converting digital code groups into sets of signals representing discrete amplitude levels. Digital code groups generated by samples of the analogue signal levels on a line are used to continuously approximate the peak signal level on the line. The approximated value, which is in the form of a digital code, is converted into a set of signals that correspond to discrete signal levels present in the analogue amplitude represented by the code approximation. Furthermore, while the illustrative embodiment shown for practicing the method is in the form of wired circuitry, it is obvious that a stored program computer could also perform the steps of the method.

What is claimed is:

1. In combination:
an amplitude code store;
a comparator for comparing the absolute value of an input digital code with a selected digital code stored in said amplitude code store;
translator means for translating said stored code into a plurality of signals representing discrete amplitude levels; and
circuitry responsive to said comparator for replacing said stored code in said amplitude code store with said absolute value of said input code when a selected relation exists between the codes.

2. The combination of claim 1 further comprising:
timing means responsive to said comparator for generating timing signals;
where said circuitry is responsive to selected combinations of signals generated by said comparator and said timing signals.

3. The combination of claim 2 where said timing means further comprises:
a timing code store;
timing logic responsive to said comparator for selectively altering the contents of memory locations in said timing code store; and
a timing code detector selectively responsive to said contents of memory locations in said timing code store for generating timing signals.

4. The combination of claim 1 wherein said translator means further comprises:
means for converting said stored code into an analogue signal; and
a plurality of threshold detectors, each of which is biased to a different level and responsive to said analogue signal, for generating signals that represent selected discrete analogue amplitude levels.

5. In combination:
a plurality of analogue signal bearing lines;
a multiplexed PCM transmission system for transmitting PCM codes generated by samples of each of said lines in a time slot assigned to the line;
storage means;
a comparator for comparing the absolute value of each of said PCM codes generated by the sampling of a given line with a selected stored code contained in said storage means;
means responsive to said stored code for generating signals representing discrete analogue amplitude levels; and
means responsive to said comparator for replacing said stored code in said storage means with the absolute value of a transmitted PCM code when a selected relation exists between the codes.

6. A digital threshold detector comprising:
storage means;
a comparator for comparing a selected portion of an input code with a stored code contained in said storage means and generating a control signal when said portion of said input code is greater than said stored code;
means responsive to said stored code for generating signals representing discrete amplitude levels; and
means responsive to said control signal for replacing said stored code in said storage means with said portion of said input code.

7. In a time-divided system, the common time-shared digital threshold detector comprising:
time-divided storage means;
a common time-shared comparator for comparing the absolute value of an input digital code occurring in the $i^{th}$ time slot with a stored digital code contained in a memory location of said storage means associated with said $i^{th}$ time slot;
common time-shared translator means for translating said stored code into a plurality of signals representing discrete anaologue amplitude levels; and
common time-shared circuitry responsive to said comparator for replacing said stored code in said time-divided storage means with said absolute value of said input code when a selected relation exists between the codes.

8. In a time-divided system, including common control circuitry, the digital threshold detector comprising;
a time-divided amplitude code storage means;
a time-divided timing code storage means;
a comparator for comparing a selected portion of the input codes occurring in the $i^{th}$ time slot with a stored amplitude code contained in a memory location of said storage means associated with said time slot and generating a control signal when said portion of said input code is less than said stored amplitude code;
translator means for translating said stored code into signals representing discrete analogue amplitude levels;
timing means responsive to each occurrence of said control signal for incrementing a timing code in a location of said timing code storage means associated with said time slot;
a timing code detector for generating a timing signal when said timing code reaches a selected value; and
write logic responsive to said control signal and said timing signal for replacing said stored amplitude code in said amplitude code storage means with said portion of said input code.

9. The digital threshold detector of claim 8 wherein said write logic is responsive to said control signal, said timing signal and an interrogate signal generated by said common control circuitry.

10. The digital threshold detector of claim 9 further comprising:
means responsive to said control signal, said timing signal and said interrogate signal for clearing the said timing code in said location of said timing code storage means associated with said time slot.

11. A method for translating digital code groups generated by repetitive samples of the analogue signal level on a line into a set of signals corresponding to discrete analogue amplitude levels present in the analogue signal for use by control circuitry comprising the steps of:
(1) comparing the absolute value of each code group with an amplitude code stored in an amplitude code store;
(2) translating said stored amplitude code into a set of signals corresponding to selected amplitude levels present in the analogue amplitude represented by said stored code; and
(3) replacing said stored code in said amplitude code store with said absolute value of a code group when the absolute value of the analogue amplitude represented by said code group exceeds the value of said stored amplitude code.

12. The method of claim 11 further comprising the steps of:
(4) incrementing a timing code for each successive comparison indicating that the absolute value of the compared code group is less than said stored amplitude code;
(5) inhibiting the incrementing operation when said timing code reaches a selected value; and
(6) replacing said stored amplitude code in said amplitude code store with the absolute value of the next code group, generated by a sample of said line which occurs simultaneously with an interrogate signal generated by said control circuitry, if the magnitude of the signal level on said line remains less than the magnitude represented by said stored amplitude code from the time step (5) is performed through the generation of said next code group.

References Cited

UNITED STATES PATENTS

| | | | |
|---|---|---|---|
| 3,267,459 | 8/1966 | Chomicki | 325—38 A |
| 3,369,229 | 2/1968 | Dorros | 325—38 A |

| | | | |
|---|---|---|---|
| 3,032,610 | 5/1962 | Villars | 340—34 |
| 3,520,999 | 7/1970 | May | 179—15 AS |
| 3,508,007 | 4/1970 | Goodall | 179—15 AS |

MAYNARD R. WILBUR, Primary Examiner

T. GLASSMAN, Assistant Examiner

U.S. Cl. X.R.

179—15 AS; 325—38 A

UNITED STATES PATENT OFFICE

CERTIFICATE OF CORRECTION

Patent No. 3,706,091 Dated December 12, 1972

Inventor(s) Carl J. May, Jr.

It is certified that error appears in the above-identified patent and that said Letters Patent are hereby corrected as shown below:

Column 2, line 72 "$\underline{i}^{ht}$" should read --$\underline{i}^{th}$--.
Column 3, line 47 "increased" should read --incremented--; after "After" insert --the--;
54 "$S'_i$-$S'_m$" should read --$S'_1$-$S'_m$--;
57 "$S'_i$-$S'_m$" should read --$S'_1$-$S'_m$--;
60 "$S'_i$-$S'_m$" should read --$S'_1$-$S'_m$--;
68 "circuit" should read --circuitry--.
Column 5, line 10 "$C_{i2}$" should read --$S_{i2}$--;
12 "$S'_1$-$C'_m$" should read --$S'_1$-$S'_m$--;
18 "equa" should read --equal--;
23 "$C_{i+i}$" should read --$C_{i+1}$--.
Column 6, line 27 "$S'_i$" should read --$S'_1$--.

Signed and sealed this 29th day of May 1973.

(SEAL)
Attest:

EDWARD M.FLETCHER,JR.
Attesting Officer

ROBERT GOTTSCHALK
Commissioner of Patents